United States Patent
Henning

(10) Patent No.: US 10,486,872 B2
(45) Date of Patent: Nov. 26, 2019

(54) WATER-SOLUBLE CONTAINER AND METHOD FOR THE PRODUCTION THEREOF

(71) Applicant: Henkel AG & Co. KGaA, Duesseldorf (DE)

(72) Inventor: Ingomar Henning, Cologne (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/522,173

(22) PCT Filed: Nov. 2, 2015

(86) PCT No.: PCT/EP2015/075489
§ 371 (c)(1),
(2) Date: Apr. 26, 2017

(87) PCT Pub. No.: WO2016/071294
PCT Pub. Date: May 12, 2016

(65) Prior Publication Data
US 2017/0313486 A1    Nov. 2, 2017

(30) Foreign Application Priority Data
Nov. 5, 2014 (DE) .......................... 10 2014 222 602

(51) Int. Cl.
*B65D 65/46* (2006.01)
*C11D 17/04* (2006.01)
(Continued)

(52) U.S. Cl.
CPC .............. *B65D 65/46* (2013.01); *B29C 43/08* (2013.01); *B29C 43/361* (2013.01); *B29C 45/1704* (2013.01); *B29C 45/1706* (2013.01); *B65B 1/02* (2013.01); *B65B 3/022* (2013.01); *B65B 5/02* (2013.01); *B65B 7/00* (2013.01); *B65B 7/164* (2013.01); *B65B 47/02* (2013.01); *B65B 47/04* (2013.01); *B65B 63/08* (2013.01);
(Continued)

(58) Field of Classification Search
None
See application file for complete search history.

(56) References Cited

U.S. PATENT DOCUMENTS 5,783,541 A * 7/1998 Tack .................... C11D 3/3753
510/224
5,928,600 A * 7/1999 Chu .................... B29C 45/1704
264/572
(Continued)

FOREIGN PATENT DOCUMENTS

| EP | 1390270 B1 | 8/2006 |
| WO | 02085707 A1 | 10/2002 |
| WO | 2007057653 A1 | 5/2007 |

OTHER PUBLICATIONS

EPO, International Search Report and Written Opinion for International Application No. PCT/EP2015/075489, dated Feb. 8, 2016.

*Primary Examiner* — Katie L. Hammer
(74) *Attorney, Agent, or Firm* — Lorenz & Kopf, LLP

(57) ABSTRACT

The present disclosure relates to a method for producing a container for washing and/or cleaning agents from a water-soluble material and to a container that is obtained in accordance with the method as contemplated herein.

14 Claims, 3 Drawing Sheets

(51) Int. Cl.
  *B65D 85/808* (2006.01)
  *B65B 63/08* (2006.01)
  *B65B 7/00* (2006.01)
  *B29C 43/08* (2006.01)
  *B65B 1/02* (2006.01)
  *B29C 43/36* (2006.01)
  *B65B 3/02* (2006.01)
  *B29C 45/17* (2006.01)
  *B65B 47/02* (2006.01)
  *B65B 47/04* (2006.01)
  *B65B 5/02* (2006.01)
  *B65B 7/16* (2006.01)
  *B65B 65/00* (2006.01)
  *B29C 43/04* (2006.01)
  *B29K 29/00* (2006.01)
  *B29L 31/00* (2006.01)

(52) U.S. Cl.
  CPC .......... *B65D 85/808* (2013.01); *C11D 17/042* (2013.01); *C11D 17/045* (2013.01); *B29C 2043/046* (2013.01); *B29C 2043/3615* (2013.01); *B29C 2045/1715* (2013.01); *B29K 2029/04* (2013.01); *B29K 2995/0062* (2013.01); *B29L 2031/712* (2013.01); *B65B 65/003* (2013.01); *B65B 2220/14* (2013.01); *B65B 2230/02* (2013.01)

(56) References Cited

U.S. PATENT DOCUMENTS

| | | | |
|---|---|---|---|
| 2002/0169092 A1* | 11/2002 | Alexandre Catlin | B65B 9/04 510/220 |
| 2006/0281839 A1* | 12/2006 | Barthel | B65B 9/04 524/100 |
| 2007/0244024 A1 | 10/2007 | Barthel et al. | |
| 2008/0258334 A1* | 10/2008 | Hansen | B65B 3/022 264/209.1 |
| 2012/0107541 A1* | 5/2012 | Nahill | B29B 11/12 428/36.92 |

* cited by examiner

WATER-SOLUBLE CONTAINER AND METHOD FOR THE PRODUCTION THEREOF

CROSS-REFERENCE TO RELATED APPLICATION

This application is a U.S. National-Stage entry under 35 U.S.C. § 371 based on International Application No. PCT/EP2015/075489, filed Nov. 2, 2015, which was published under PCT Article 21(2) and which claims priority to German Application No. 10 2014 222 602.3, filed Nov. 5, 2014, which are all hereby incorporated in their entirety by reference.

TECHNICAL FIELD

The present disclosure relates to a method for producing a container for washing and/or cleaning agents from a water-soluble material and to a container that is obtained in accordance with the method as contemplated herein.

BACKGROUND

These days, washing and/or cleaning agents are often provided in prefabricated containers. As a result, active ingredients can be packaged separate from each other. Furthermore, the dosage is optimal for a washing or cleaning cycle. In order for the contained washing and/or cleaning agents to then effectively come in contact with the items to be cleaned, the containers must be water-soluble. In the sense of the present disclosure, the term "water-soluble" means that the material dissolves or disperses in water.

Different methods are proposed for producing and spatially shaping these water-soluble packages. EP 1 776 448 B1 discloses the deep-drawing of a film, whereas EP 1 390 270 B1 describes the injection-molding method as a possible production method.

The injection-molding method comprises the steps of liquefying the material, which is then introduced into a mold under pressure. In said mold, the material returns to the solid state by means of cooling or a cross-linking reaction and can be removed as a finished part after the tool has been opened. Molded parts can be economically produced in large quantities by means of this method. However, tools, in which the actual material is injected, are required. The exchange of a mold is always associated with changes to the whole tool, resulting in high costs.

Apart from the actual production of the container, it is also of interest that said container can be filled with a filling good and in particular with washing and/or cleaning agents as easily as possible. Said washing and/or cleaning agents are typically in the form of liquids, gels, pastes, or powders. It should be possible to introduce said washing and/or cleaning agents into the container as simply as possible. In particular, it would be desirable if the method for producing the container and the method for introducing the agent could be linked together in a simple manner.

BRIEF SUMMARY

Methods for producing a container for washing and/or cleaning agents from a water-soluble material and a container that is obtained in accordance with the method are provided herein. In an embodiment, the method includes:
a) introducing the water-soluble material into a lower part of a tool,
b) optionally, temperature-controlling the tool, and
c) closing the tool by applying an upper part of the tool to the lower part and building up pressure to form the container.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Surprisingly, it has been found that the disadvantages from the prior art can be avoided by employing compression molding as contemplated herein. Therefore, in a first embodiment, the problem addressed by the present disclosure is solved by employing a method for producing a container for a filling good and in particular for washing and/or cleaning agents from a water-soluble material, comprising
a) introducing the water-soluble material into a lower part (C) of a tool (A),
b) optionally temperature-controlling the tool (A), and
c) closing the tool (A) by applying an upper part (B) of the tool (A) to the lower part (C) and building up pressure to form the container.

Figure 1:
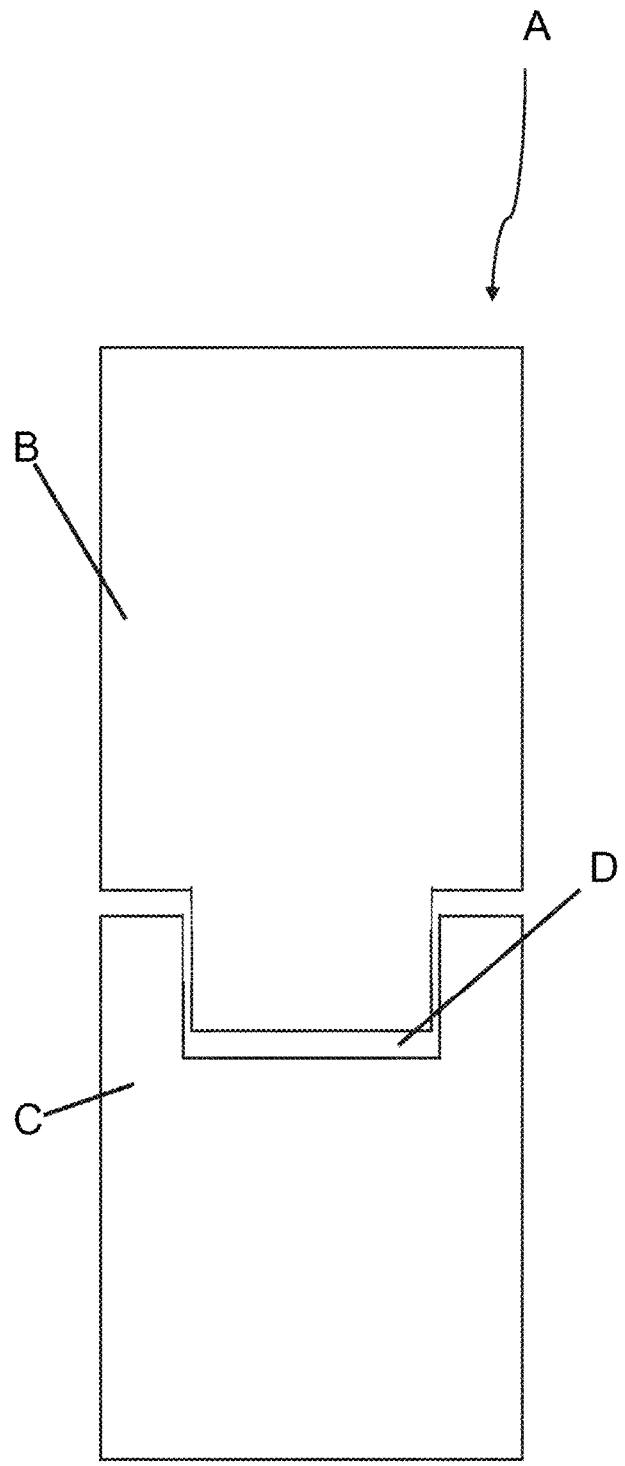
FIG. 1 is a schematic cross-sectional side view of a tool employed in a method of producing a container in accordance with an embodiment.

Therefore, in the method as contemplated herein, the material from which the container is molded is first introduced into the lower part (C) of a tool (A). In the sense of the present disclosure, a tool (A) comprises an upper part (B) and a lower part (C). In the closed state of the tool (A), as schematically shown in FIG. 1, there is a void (D) between the upper part (B) and the lower part (C). Said void (D) determines the later shape of the container. To fill the tool (A), the upper part (B) is separated from the lower part (C) so that the water-soluble material can be introduced into the lower part (C) without the upper part (B) spatially preventing this. After the water-soluble material has been introduced into the lower part (C) of the tool (A), the tool is closed. This means that the upper part (B) is applied to the lower part (C) and, by a building up of pressure, the water-soluble material is brought into the shape that is defined by the void (D). It is possible that the tool (A) consists of a plurality of individual components that can be exchanged independently of each other. However, it is also possible that the tool (A) is designed as a single piece, i.e., the upper part (B) and the lower part (C) are movably connected to each other.

The water-soluble material can be in the form of granular material or powder, for example. For example, the water-soluble material can be plasticized in an extruder and then introduced into the lower part (C) of the tool (A) by employing said extruder.

The tool (A) is optionally temperature-controlled when the water-soluble material is introduced into the tool (A). In the sense of the present disclosure, the term "temperature-control" means holding the temperature in a certain range. This can also mean the removal of excess heat. If the tool (A) is closed under pressure, a temperature increase occurs. The heat thereby generated can be removed by employing the temperature-control of the tool (A), for example.

Figure 3:
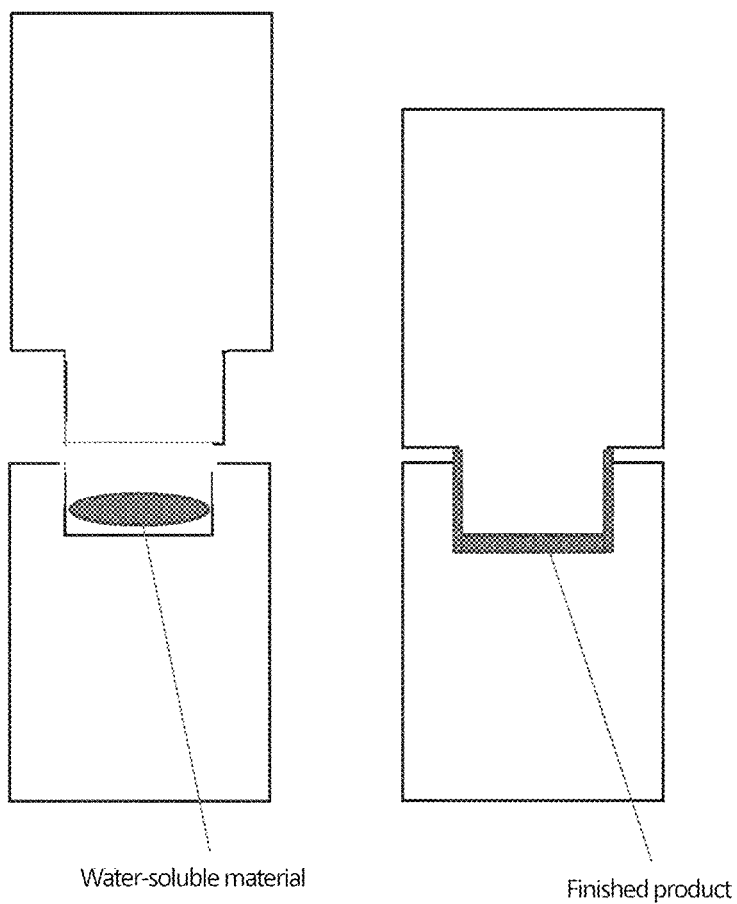
FIG. 3 is a schematic cross-sectional side views of a tool during an advanced stage of a method of producing a container in accordance with an embodiment.

As a result of the closing of the tool (A) under pressure, the material assumes the shape of the void (D). Any structural design of the void (D) determines the shape and appearance of the produced container. This is schematically shown in FIG. 3.

The material that is introduced into the tool (A) is heated to such a temperature that said material is flowable. In the sense of the present disclosure, the term "flowable" means that the material can be brought into a defined three-dimensional shape by employing compression molding. The material is preferably heated to a temperature that lies above the melting temperature of the water-soluble material. In particular, the material is heated to a temperature that exceeds the melting temperature of the water-soluble material by 20° C. to 30° C.

The material can be heated, for example by employing an extruder, to a temperature at which the material is flowable. The closing of the cavity induces shear, which can lead to a further temperature increase inside the tool (A). This additional heat amount, and also the heat down to the solidification point, below which demolding stability is achieved, can then be removed from the tool (A), which should be understood to mean temperature-control in the sense of the present disclosure. Therefore, steps b) and c) of the method as contemplated herein can also occur simultaneously.

In comparison with the injection-molding method, the temperatures necessary as contemplated herein for the purpose of shaping are approximately about 20° C. to about 30° C. lower. This means that less energy is used in production. Furthermore, the selection of the possible starting materials is more flexible.

A water-soluble material known in the prior art can be used as the water-soluble material. As contemplated herein, water-soluble polymers are polymers that have a solubility in water of more than about 2.5 wt % at room temperature.

The water-soluble or water-dispersible material can comprise a polymer, a copolymer, or mixtures thereof. Preferred water-soluble materials preferably comprise, at least partly, at least one substance from the group consisting of (acetalated) polyvinyl alcohol, polyvinylpyrrolidone, polyethylene oxide, gelatin, sulfate-, carbonate-, and/or citrate-substituted polyvinyl alcohols, polyvinylpyrrolidones, polyalkylene oxides, acrylamides, cellulose esters, cellulose ethers, cellulose amides, cellulose and derivatives thereof (such as hydroxypropyl methylcellulose), polyvinyl acetates, polycarboxylic acids and salts thereof, polyamino acids or peptides, polyamides, polyacrylamides, copolymers of maleic acid and acrylic acid, copolymers of acrylamides and (meth)acrylic acid, polysaccharides, such as starch or guar derivatives, gelatin, and the polymers known under the INCI names Polyquaternium 2, Polyquaternium 17, Polyquaternium 18, and Polyquaternium 27. The water-soluble material is especially preferably a polyvinyl alcohol.

In one embodiment as contemplated herein, the water-soluble material comprises mixtures of different substances. Such mixtures make it possible to set the mechanical properties of the container and can influence the degree of the water solubility.

The term "polyvinyl alcohols" (abbreviation PVAL, occasionally also PVOH) is the designation for polymers of the general structure

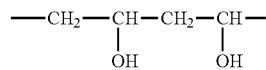

said polymers also containing structural units of the type

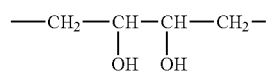

in small proportions (approximately 2%).

Commercially available polyvinyl alcohols, which are offered as yellowish white powders or granular materials having degrees of polymerization in the range of approximately 100 to 2500 (molar masses of approximately 4000 to 100,000 g/mol), have degrees of hydrolysis of 98-99 or 87-89 mol % and therefore also contain a residual content of acetyl groups. The polyvinyl alcohols are characterized by the manufacturers by specification of the degree of polymerization of the starting polymers, the degree of hydrolysis, the saponification number, and/or the solution viscosity.

Polyvinyl alcohols are soluble in water and a few strongly polar organic solvents (formamide, dimethylformamide, dimethyl sulfoxide) in accordance with the degree of hydrolysis. Polyvinyl alcohols are not attacked by (chlorinated) hydrocarbons, esters, fats, and oils. Polyvinyl alcohols are classified as toxicologically harmless and are at least partially biodegradable. The water solubility can be reduced by post-treatment with aldehydes (acetalation), by complexation with Ni salts or Cu salts, or by treatment with dichromates, boric acid, or borax. Coatings of polyvinyl alcohol are largely impermeable to gases such as oxygen, nitrogen, helium, hydrogen, and carbon dioxide but allow water vapor to pass through.

In the present disclosure, it is preferred that the water-soluble material at least partly comprises a polyvinyl alcohol having a degree of hydrolysis of from about 70 to about 100 mol %, preferably from about 80 to about 90 mol %, especially preferably from about 81 to about 89 mol %, and in particular from about 82 to about 88 mol %. In a preferred embodiment, the water-soluble material consists of at least about 20 wt %, especially preferably at least about 40 wt %, exceedingly preferably at least about 60 wt %, and in particular at least about 80 wt %, of a polyvinyl alcohol having a degree of hydrolysis of from about 70 to about 100 mol %, preferably from about 80 to about 90 mol %, especially preferably from about 81 to about 89 mol %, and in particular from about 82 to about 88 mol %.

The polyvinyl alcohols described above are widely commercially available, for example under the trademark Mowiol® (Clariant). Polyvinyl alcohols especially suitable in the present disclosure are, for example, Mowiole 3-83, Mowiol® 4-88, Mowiol® 5-88, Mowiol® 8-88, L648, L734, and Mowiflex LPTC 221 from KSE and the compounds of Texas Polymers, such as Vinex 2034.

The water solubility of PVAL can be changed by post-treatment with aldehydes (acetalation) or ketones (ketalization). Polyvinyl alcohols that are acetalated or ketalized with the aldehyde or keto groups of saccharides or polysaccharides or mixtures thereof have been found to be especially preferred and, because of the exceptionally good cold water solubility thereof, especially advantageous. The use of the reaction products of PVAL and starch is extremely advantageous.

Furthermore, the water solubility can be changed by complexation with Ni salts or Cu salts or by treatment with dichromates, boric acid, or borax and in this way can be specifically set to desired values. Films of PVAL are largely impermeable to gases such as oxygen, nitrogen, helium, hydrogen, and carbon dioxide but allow water vapor to pass through.

Preferred water-soluble materials are characterized in that said water-soluble materials comprise hydroxypropyl methylcellulose (HPMC) having a degree of substitution (average number of methoxy groups per anhydroglucose unit of the cellulose) of from about 1.0 to about 2.0, preferably from about 1.4 to about 1.9, and a molar substitution (average number of hydroxypropoxyl groups per anhydroglucose unit of the cellulose) of from about 0.1 to about 0.3, preferably from about 0.15 to about 0.25.

Polyvinylpyrrolidones, abbreviated as PVP, are produced by radical polymerization of 1-vinylpyrrolidone. Commercially available PVPs have molar masses in the range of approximately 2,500 to 750,000 g/mol and are offered as white, hygroscopic powders or as aqueous solutions.

Polyethylene oxides, abbreviated as PEOX, are polyalkylene glycols of the general formula

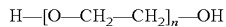

that are technically produced by the basically catalyzed polyaddition of ethylene oxide (oxirane) in systems usually containing small amounts of water, with ethylene glycol as a starting molecule. Polyethylene oxides typically have molar masses in the range of approximately 200 to 5,000,000 g/mol, corresponding to degrees of polymerization n of approximately 5 to >100,000. Polyethylene oxides have an extremely low concentration of reactive hydroxy terminal groups and exhibit only weak glycol properties.

Gelatin is a polypeptide (molar mass: approximately 15,000 to >250,000 g/mol) that is obtained mainly by the hydrolysis of the collagen contained in the skin and bones of animals under acidic or alkaline conditions. The amino acid composition of gelatin corresponds largely to the amino acid composition of the collagen from which the gelatin was obtained and varies in accordance with the origin of said collagen. Gelatin is used very extensively as water-soluble shell material in particular in the pharmaceutical field, in the form of hard or soft gelatin capsules. Gelatin is used only little in the form of films because of the high price of gelatin in comparison with the polymers mentioned above.

In the present disclosure, water-soluble materials that comprise a polymer from the group of starch and starch derivatives, cellulose and cellulose derivatives, in particular methyl cellulose, and mixtures thereof are preferred.

Starch is a homoglycan, wherein the glucose units are α-glycosidically linked. Starch is constructed of two components of different molecular weight: approximately 20 to 30% of straight-chain amylose (molecular weight: approximately 50,000 to 150,000) and about 70 to about 80% of branched-chain amylopectin (molecular weight: approximately 300,000 to 2,000,000). In addition, small amounts of lipids, phosphoric acid, and cations are contained. While the amylose, because of the 1,4 bonds, forms long, helical, twisting chains having approximately 300 to 1,200 glucose molecules, the amylopectin chain branches off through a 1,6 bond after 25 glucose structural units on average, forming a branch-like structure having approximately 1,500 to 12,000 molecules of glucose. In addition to pure starch, starch derivatives obtainable from starch by polymer-analogous reactions are also suitable for producing water-soluble containers in the present disclosure. Such chemically modified starches comprise, for example, products from esterification or etherification in which hydroxy hydrogen atoms were substituted. However, starches in which the hydroxy groups were replaced with functional groups not bonded through an oxygen atom also can be used as starch derivatives. For example, alkali starches, carboxymethyl starch (CMS), starch esters and ethers, and amino starches fall within the group of the starch derivatives.

Pure cellulose has the formal gross composition (C6H10O5) and is formally a β-1,4-polyacetal of cellobiose, cellobiose in turn being constructed of two molecules of glucose.

Suitable celluloses consist of approximately 500 to 5,000 glucose units and therefore have average molar masses of about 50,000 to about 500,000. Cellulose derivatives obtainable from cellulose by polymer-analogous reactions are also usable as cellulose-based disintegration agents in the present disclosure. Such chemically modified celluloses comprise, for example, products from esterification or etherification in which hydroxy hydrogen atoms were substituted. However, celluloses in which the hydroxy groups were replaced with functional groups not bonded through an oxygen atom also can be used as cellulose derivatives. For example, alkali celluloses, carboxymethyl cellulose (CMC), cellulose esters and ethers, and amino celluloses fall within the group of the cellulose derivatives.

The water-soluble material can have further additives. Said additives are, for example, plasticizers, such as dipropylene glycol, ethylene glycol, or diethylene glycol, water, or decomposing agents.

Polyvinyl alcohol is especially preferably used as the water-soluble material. Polyvinyl alcohol is easy to process and can be obtained economically in comparison with other water-soluble materials. In addition, polyvinyl alcohol is especially highly soluble in water and therefore enables a wide variety of usage possibilities of the produced container.

The method as contemplated herein can be performed on a round table. The containers produced in accordance with the method as contemplated herein are thus already optimally oriented so that the containers can be filled immediately thereafter. The method as contemplated herein preferably also comprises at least a step d) of filling the container with at least one filling good and a step e) of subsequently sealing the container. A corresponding device is schematically shown in FIG. 2.

Figure 2:
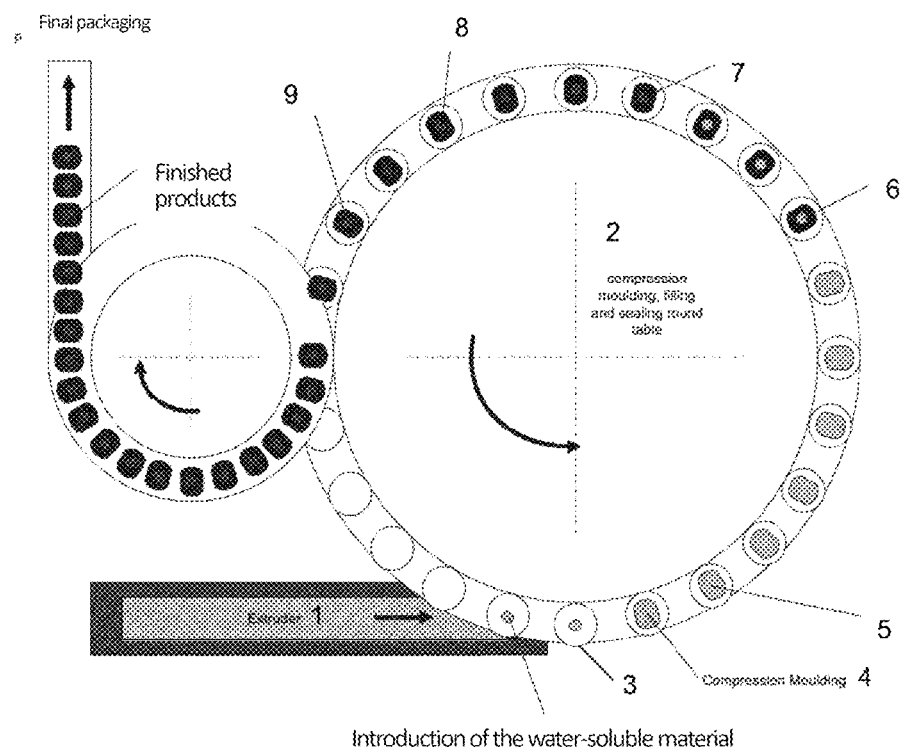
FIG. 2 is a schematic top view of device employed to perform a method of producing a container in accordance with an embodiment.

In FIG. 2, the water-soluble material is transported to the round table (2) by employing an extruder. The type of transport depends on the chosen water-soluble material. If the material is in the form of a powder or granular material, for example, the material can be transported to the round table (2) by employing a screw conveyor, a fall-pipe, or similar devices known to a person skilled in the art, for example. The material is preferably heated and continuously extruded in an extruder. If material sufficiently exits the extruder, the material can be scraped off and introduced into the cavity.

On the round table (2), there are tools (cavities) (3), into which the water-soluble material is introduced. As soon as one of the cavities is filled with the water-soluble material, said cavity is heated and the water-soluble material is brought into the desired container shape by employing a pressure ram. In a preferred embodiment, at least one cooling station (5) immediately follows this compression molding station (4) on the round table (2). At the at least one cooling station (5), the containers produced in the compression molding station (4) can cool down, i.e., the heat necessary during the compression molding process can be released to the surroundings. Active cooling is not necessarily required. However, it is also possible to actively cool the tools (cavities) (3) still warm because of the production method, for example by employing a gas flow, in particular an air flow. The container is cooled preferably to a temperature in the range of from about 20° C. to about 60° C., in particular from about 20° C. to about 40° C.

If the container has reached a temperature at which the container is dimensionally stable, the container can be filled with a filling material in a filling station (6) on the round table (2). The container can have a temperature that lies about 20° C. above the temperature at which the container is dimensionally stable; in particular, the container has a temperature in the range of from about 20° C. to about 120° C., preferably from about 30° C. to about 100° C., during the filling process. As contemplated herein, the container can be designed in such a way that the container can have different filling materials in different regions, which filling materials then do not come in contact with each other in the container. It is therefore possible as v herein that the round table has further filling stations (7, 8), in which further filling materials are introduced into the container. In the sense of the present disclosure, the term "dimensionally stable" means that the shape of the container is not changed by the filling process. For this purpose, the container must have a temperature that lies below the melting temperature of the water-soluble material. However, as contemplated herein, it is not necessary that the container cools down completely to room temperature, i.e., to a temperature of approximately 20° C.

As contemplated herein, it is therefore possible to fill the container before the material has completely cooled to room temperature. The advantage is that the molded part, i.e., the container, remains in the mold, i.e., the tool (A), and therefore is supported by the tool (A). By filling the containers at a temperature that lies above room temperature, the containers can be further cooled by the filling material (filling good). Thus, by employing the filling material or filling good, active heat absorption and therefore active cooling of the container can also occur. This makes it possible to produce filled containers more quickly. The maximum temperature of the containers at which the containers can be filled depends on the water-soluble material and on the melting temperature thereof. However, the material with which the container is filled (filling material, filling good) is also significant. If said material is a liquid, the temperature of the container lies below the boiling temperature of the liquid. If the container is filled with a solid, the temperature of the container lies below the melting temperature of the solid. The temperature of the container is preferably at least about 10° C., in particular at least about 15° C., below the boiling temperature or the melting temperature.

In the sense of the present disclosure, the terms "filling material" and "filling good" are used synonymously. These are washing and/or cleaning agents, which can be in solid or liquid form. As contemplated herein, the container can have only one region, into which the filling material is introduced. However, it is also possible that the container has two or more regions, which are separated from each other by the water-soluble material. As contemplated herein, different filling materials can be introduced into said regions. Solid and liquid filling materials can be introduced into one region. However, it is also possible that a solid filling material is introduced into one region and a liquid filling good is introduced into another region.

After the filling material has been introduced into the container, the container can be sealed on the round table (2). This occurs preferably in a suitable sealing station (9). Then the filled container can be removed from the round table (2) and fed to a packaging station (10).

As contemplated herein, it is therefore possible not only to produce containers, but also to directly fill and seal said containers, on one round table (2). This enables short cycle times of less than about 20 seconds, in particular less than about 8 seconds. Cycle times of from about 3 to about 8 seconds can be achieved. Depending on the product, cycle times of about 2 seconds can be achieved. Such inline filling is not possible with other methods described in the prior art.

As contemplated herein, it is also possible that the first filling station (6) and the optional further filling stations (7, 8) are not on the same round table (2) on which the molding occurs. In this embodiment, the container is transported to a further round table, preferably directly, after the cooling in the cooling station (5), on which further round table the filling station and the sealing station are located. The transport occurs in such a way that the spatial arrangement of the containers is maintained. Because of the method as contemplated herein, after the cooling, the containers are in an orientation that enables direct filling with one or more washing or cleaning agents. As contemplated herein, this orientation is maintained during the transport to a further round table in this embodiment.

In the sense of the present disclosure, round tables (2) can be rotary disks, rotary plates, or other circularly rotating devices on which cavities can be mounted.

Because the produced containers no longer have to be stored in this preferred embodiment, but rather can be filled immediately after the production process, the material usage can be reduced. The filled container has high stability because of the contents. The rejection of containers, which is necessitated by storage of the empty containers, is not required here. Therefore, the method is sustainable and efficient in comparison with the methods known in the prior art.

In addition to the integration of the filling station, the integration of a sealing station (9) on the same round table (2) or on a directly following rotary station is also possible. This enables a very efficient and also flexible filling-line configuration.

Therefore, the method as contemplated herein enables optimal process integration and leads to an inline filling process from the primary packaging to the final product. Stacking of secondary packaging can be linked in a simple manner. This reduces investment costs.

In the method as contemplated herein, the container shape can be adapted to the desired filling good by simply exchanging the upper part (B) and/or the lower part (C) of the tool (A). In the method as contemplated herein, different tools (A) that can be quickly exchanged can also be combined with each other, resulting in a multiplicity of possibilities for the spatial design of the container.

The sealing of the containers after the filling process can be accomplished in such a way that regions provided in the container are connected to each other in such a way that the filling good contained in a closed void formed by the sealing process can no longer escape. However, it is also possible that the container is sealed with a further water-soluble material. The sealing material is preferably identical to the material of the container.

In a further embodiment, the problem addressed by the present disclosure is solved by employing a container that is produced in accordance with the method as contemplated herein. In particular, the container is dimensionally stable. This means that the container substantially maintains the shape thereof directly after the actual production method and before the filling process. The container is not brittle. Therefore, the container does not break if pressure is applied to the container. However, if the container is stored over a long period of time, it is possible that the container does not completely maintain the shape thereof and, for example, the full height of side walls oriented upward is not retained.

The method as contemplated herein makes it possible to provide a water-soluble container in any spatial design. Corresponding containers are used as containers for washing and/or cleaning agents, in particular.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for producing a container for washing and/or cleaning agents from a water-soluble material, wherein the method comprises:
   a) introducing the water-soluble material into a lower part (C) of a tool (A), wherein the water-soluble material is in the form of granular material and then introduced into the lower part (C) of the tool (A) by employing an extruder;
   b) optionally, temperature-controlling the tool (A),
   c) closing the tool (A) by applying an upper part (B) of the tool (A) to the lower part (C) and building up pressure to form the container; and
   d) filling the container with a filling material with the container remaining in the tool (A) during filling,.
   wherein the container is formed by compression molding and wherein the container is dimensionally stable and not changed by the step of filling (d).

2. The method according to claim 1, wherein the water-soluble material is polyvinyl alcohol.

3. The method according to claim 1, wherein the filling material comprises a washing and/or cleaning agent.

4. The method according to claim 1, wherein filling the container comprises filling the container at a temperature of the container in a range of from about 10° C. to about 120° C.

5. The method according to claim 4, wherein filling the container comprises filling the container at a temperature of the container in a range of from about 15° C. to about 100° C.

6. The method according to claim 1, further comprising sealing the container after filling the container with the filling material, wherein the container remains in the tool (A) during sealing.

7. The method according to claim 1, wherein the container remains in the lower part (C) of the tool (A) during filling.

8. The method according to claim 1, wherein at least a portion of the tool (A) is located on a round table, and wherein the container is formed and filled with the container on the round table.

9. A method for producing a container for washing and/or cleaning agents from a water-soluble material, wherein the method comprises:
   a) introducing the water-soluble material into a lower part (C) of a tool (A), wherein the water-soluble material is in the form of granular material and then introduced into the lower part (C) of the tool (A) by employing an extruder;
   b) optionally, temperature-controlling the tool (A),
   c) closing the tool (A) by applying an upper part (B) of the tool (A) to the lower part (C) and building up pressure to form the container; and
   d) filling the container with a filling material after forming the container,
   wherein the container is filled before the water-soluble material has cooled to room temperature after forming the container, wherein the container is formed by compression molding and wherein the container is dimensionally stable.

10. The method according to claim 9, wherein the container is filled a temperature of the filling material that is cooler than the container and wherein the filling material actively cools the container.

11. The method according to claim 9, wherein filling material is a liquid as filled in the container, and wherein a temperature of the container is at least 10° C. below a boiling point of the liquid filling material.

12. The method according to claim 9, wherein the filling material is a solid as filled in the container, and wherein a temperature of the container is at least 10° C. below a melting point of the solid filling material.

13. The method according to claim 9, wherein the container is filled with the filling material after forming the container with the container remaining in the tool (A) during filling.

14. The method according to claim 13, further comprising sealing the container after filling the container with the filling material, wherein the container remains in the tool (A) during sealing.

* * * * *